April 3, 1934. G. C. RENSINK 1,953,543
AIR CLEANER AND SILENCER FOR INTERNAL COMBUSTION ENGINES
Filed July 23, 1932 3 Sheets-Sheet 1

INVENTOR
George C. Rensink.
BY
H. S. Bailey. ATTORNEY

April 3, 1934.　　　　G. C. RENSINK　　　　1,953,543
AIR CLEANER AND SILENCER FOR INTERNAL COMBUSTION ENGINES
Filed July 23, 1932　　　3 Sheets-Sheet 2
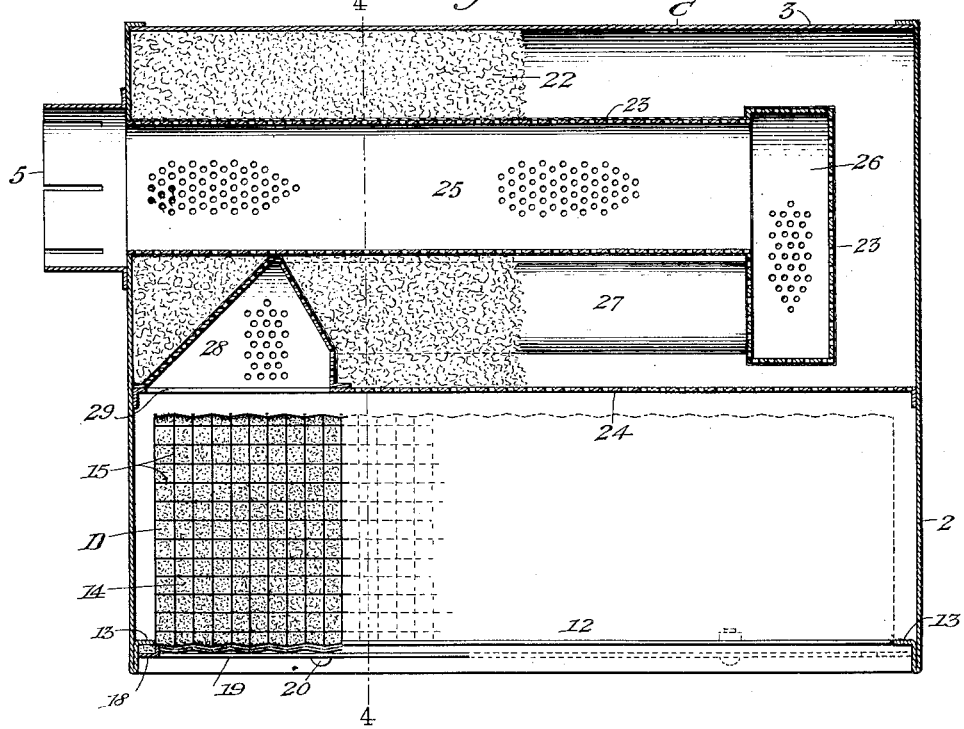
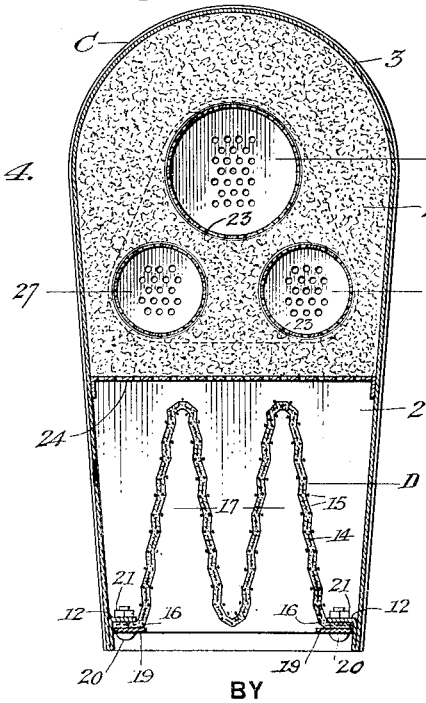
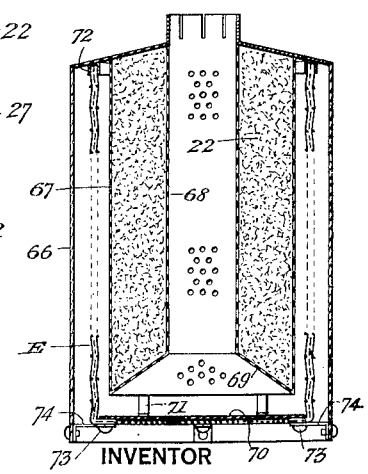
INVENTOR
George C. Rensink.
BY
H. S. Bailey ATTORNEY

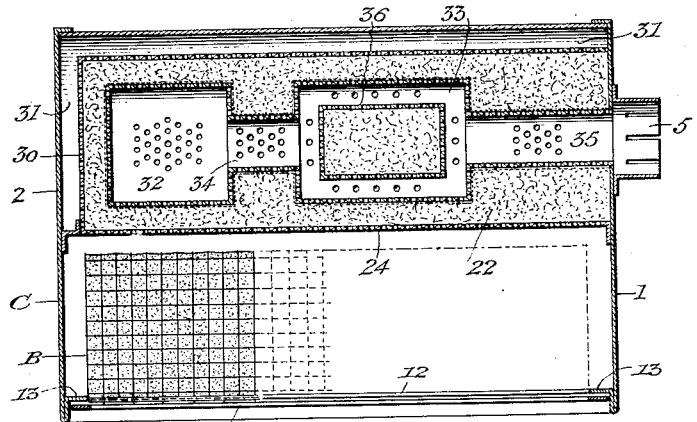
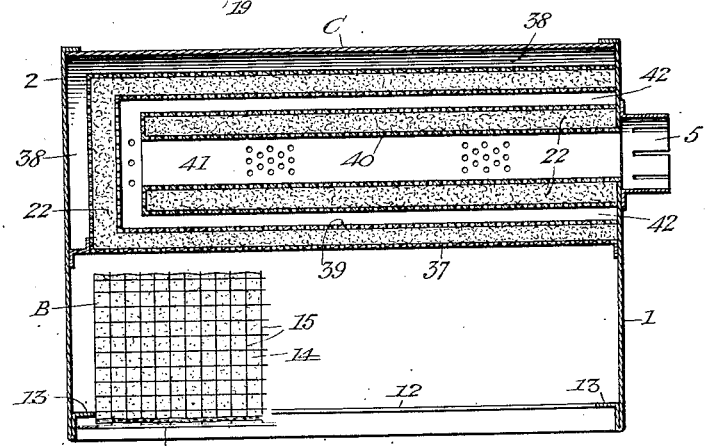
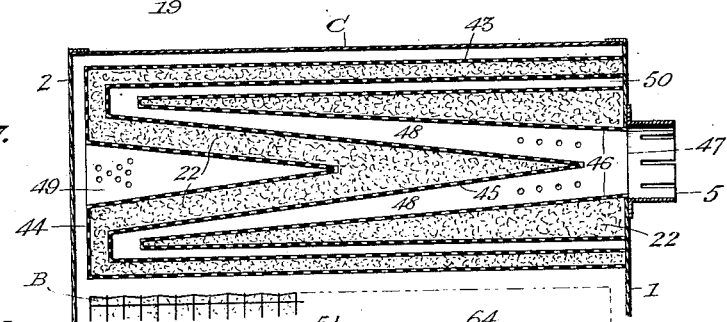
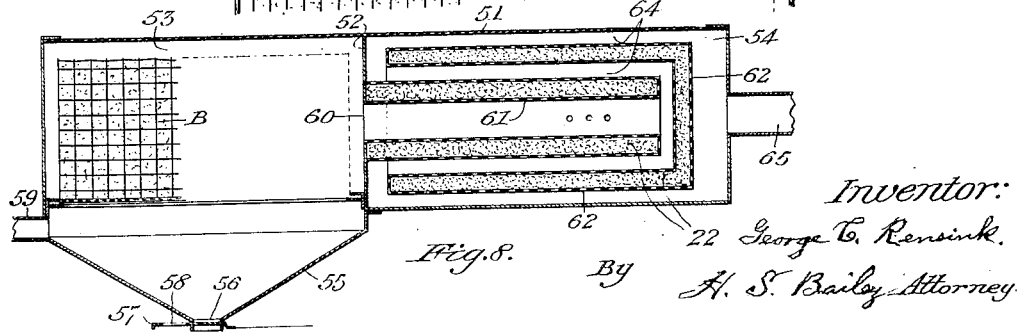

Patented Apr. 3, 1934

1,953,543

UNITED STATES PATENT OFFICE 1,953,543

AIR CLEANER AND SILENCER FOR INTERNAL COMBUSTION ENGINES

George C. Rensink, Denver, Colo.

Application July 23, 1932, Serial No. 624,278

4 Claims. (Cl. 183—71)

My invention relates to improvements in air cleaners and silencers for internal combustion engines.

The main object of the invention is to provide an air cleaner and silencer which is adaptable to any type of internal combustion engine, and can be readily installed on any type of automobile or other motor operated vehicle by varying the size of the air filter or cleaner to the piston displacement of the engine, the said cleaner being adapted to thoroughly clean the air passing to the carburetor from all dust and dirt without restricting the inflowing air.

Further, to provide an air cleaner and silencer of this character, which thoroughly cleans the air passing through it; the dust and other foreign substances separated from the air being removed from the cleaner by the natural vibratory action of the engine while in operation, whereby a self cleaning filtering medium is provided, the cleaner requiring no attention after installation.

Further, to provide a device of this character comprising a casing for attachment to a carburetor having a non-clogging air filtering element, an indirect outlet passage communicating therewith, and a sound silencing medium surrounding said passage, whereby air passing through the carburetor is not only relieved of all foreign substances but all noise connected therewith is practically eliminated.

Further, to provide an air cleaner of this character which is entirely automatic in operation, which does not in any way affect the carburetor adjustment which cannot become sufficiently clogged with dust or dirt to decrease the flow of air below the requirements of the motor, which is cheap and durable, and in which the filtering material can be removed and replaced, if necessary without the aid of a skilled attendant.

These and other objects which will hereinafter appear, are accomplished by the device illustrated in the accompanying drawings, in which:

Fig. 3 is a longitudinal sectional view of a modified form of the device shown in Fig. 1.

Fig. 4 is a sectional view thereof on the line 4—4 of Fig. 3.

Figures 5, 6 and 7 are longitudinal sectional views of forms of the device in which the air after passing through the cleaner is passed through the silencing medium before entering the outlet passage to the carburetor.

Fig. 8 is a longitudinal sectional view of a form of the device more especially adapted for cleaning and silencing the exhaust gases from the engine.

Fig. 9 is a vertical sectional view of a modified form of the cleaner and silencer, which is adapted to be disposed in a vertical position.

Figure 1:
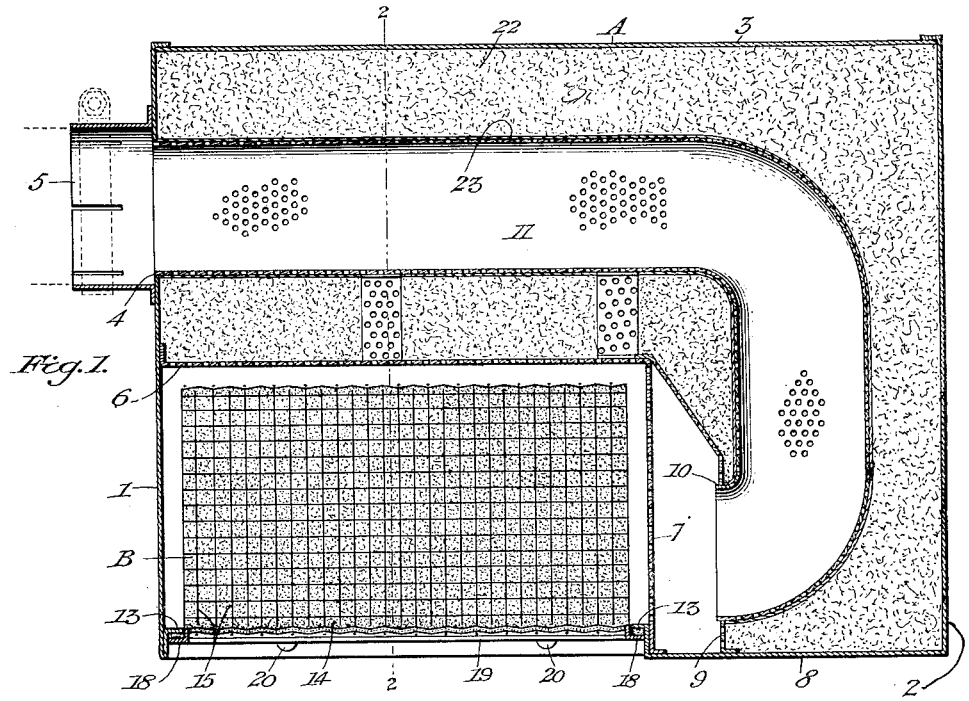
Fig. 1 is a vertical longitudinal sectional view of the preferred type of air cleaner and silencer.
Figure 2:
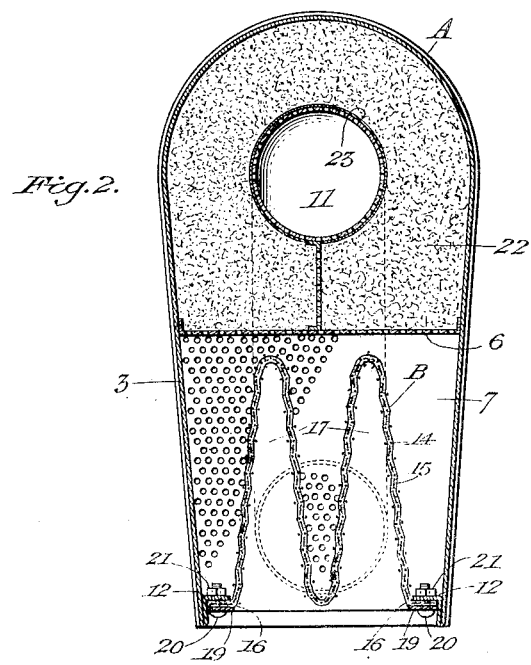
Fig. 2 is a sectional view thereof on the line 2—2 of Fig. 1.

Referring particularly to Figures 1 and 2 of the drawings:—

The letter A refers to a casing comprising end plates 1 and 2 which are secured upon an inverted U-shaped member 3 which forms the top and sides of the casing which is open on its bottom for about two-thirds of its length and the end 1 is formed with a circular opening 4 near its upper end which is surrounded by a short neck 5 which is adapted to fit upon and be clamped to the intake member of a carburetor. A closely perforated horizontal plate 6 is positioned within the casing about half way of its height and extends from the end plate 1 approximately two-thirds the length of the casing and terminates in a right angled plate 7 which extends to the bottom of the casing and is also perforated and its lower end is secured to a horizontal inturned portion 8 of the end plate 2; this inturned portion thus closing the bottom of the casing for about one-third of its length, as will be understood by reference to Fig. 1. Spaced a short distance from the plate 7 is another perforated plate 9, the lower edge of which rests upon and is secured to the inturned plate 8. The plate 9 extends vertically for the greater part of its height and then is bent over at an inclination and its upper end is secured to the adjacent end of the horizontal plate 6. The plate 9 is formed with a circular opening 10 of the same diameter as the hole 4 in the end plate 1 and a perforated metal tube 11 is secured at one end in the said hole 4 and extends horizontally to a point about in line with the plate 9 where it curves and extends downwardly and its other end is secured in the hole 10 in the plate 9. Within the space defined by the horizontal plate 6, the end plate 1, the plate 7 and the sides of the casing is secured the air cleaner B which is arranged and constructed in the following manner:

The lower end portion of the sides of the casing are bent upwardly a short distance and then at right angles to form horizontal flanges 12 and the end plate 1 and bottom plate 8 are bent in the same manner to form horizontal flanges 13, the purpose of these flanges being hereinafter shown.

The air cleaner B, forming part of the present invention, is substantially the same in construction as that shown in Fig. 2 of a United States patent which was granted to me on August 19, 1930, No. 1,773,600, and comprises a suitable filtering medium 14, preferably filtering paper, one or more sheets being used, as conditions may require. The filter paper is placed between two pieces of coarse wire screen 15, which are pressed against the paper, and the sheet thus formed is bent into the outline of the letter M, the upper ends and the lower end of the central portion of which are rounded, while the lower outer edges thereof are bent out at right angles at 16 to form narrow flanges. The screen thus formed presents four upright walls or screen surfaces arranged in connected pairs, the walls of each pair converging slightly toward their upper terminals, and the space between each pair of walls is closed at each end by an end plate 17 to which the ends of the inside screen wires are soldered, and the lower edge portions of these end plates 17 are bent outwardly at right angles to form narrow flanges 18. The screen or air cleaner thus formed is inserted in the bottom end of the casing, their flanges 16 engaging the flanges 12 on the side walls of the casing, while their flanges 18 engage the flanges 13. Strips 19 are secured at their ends to the flanges 18, and lie against the under sides of the screen flanges 16, and screws 20 are passed through these strips, the flanges 16, the flanges 12, and into nuts 21 which are soldered upon the upper sides of the said flanges 12, thus securing the air cleaner within the housing. Pieces of the filter paper may be placed between the flanges on the air cleaner and those on the casing to prevent the entrance of dust or grit at these points. It will thus be seen that the air cleaner is open at the bottom and presents two pairs of converging walls which permit the dust and dirt separated from the inflowing air to automatically fall away from the screen walls, under the vibratory action of the engine, and discharge through the open bottom of the casing.

The improved air screen or cleaner not only thoroughly separates all dust and foreign substance from the air passing through it, but it is also in itself a sound silencing medium. In order, however, to provide a thorough and effective silencer in connection with the improved cleaner, I pack the casing with any suitable sound absorbing material 22, such as mineral fibre, cotton, wool, or steel, copper or other metallic wool, so that this material entirely surrounds the perforated air tube 11, between the casing walls and the plates 6 and 9, and the double purpose of air cleaning sound silencing are accomplished in a single device.

The surface area of the screen or cleaner must be sufficient to prevent retarding of the inflowing air, or about one square inch of screen surface to two or two and one-half cubic inches of piston displacement, and a direct air passage from the cleaner to the carburetor should be avoided in order to give the silencing material time to absorb the sound, and these requirements are met by the ample screen surface provided by the improved cleaner and by the indirect passage between the cleaner and the outlet to the carburetor.

In the practical operation of this type of cleaner and silencer, the same is connected to the carburetor by slipping the neck 5 of the casing over the inlet of the carburetor and clamping it thereon in any suitable manner. The air, under the suction action of the engine pistons, is drawn through the open bottom of the casing and into the cleaner and through the four inclined walls thereof, by which it is thoroughly cleaned of dust and grit and all other foreign substances, ample space being left between the casing walls and the outer faces of the cleaner and between the two inner faces of the cleaner to permit the free passage of the air. The main volume of the cleaned air then passes through the perforated plate 7, and into the adjacent end of the perforated pipe 11. The perforated plate 7 breaks the velocity of the air and eliminates the whistling or humming noise which would otherwise be produced by entrance of the air into the end of the tube, and the air is drawn through the tube and into the carburetor. As the tube is closely perforated throughout its entire surface, the noise caused by the rushing air passes through the perforations and into the surrounding silencing material which effectually absorbs or deadens it. A portion of the filtered air passes up through the perforated plate 6 and through the silencing material and into the tube, so that the entire volume of air passing through the cleaner is drawn into the tube without being retarded in its passage. The form of cleaner herein shown and described provides a maximum filtering surface and one which is self cleaning, as its inclined filtering faces permit the dust and grit particles to drop off under the vibrating action of the engine, and the filter paper so thoroughly cleanses the air, that clogging of the silencing material is prevented. In order to prevent any of the silencing material from being drawn into the tube, the same is surrounded by a jacket 23 of suitable fabric, such as cheese cloth which permits a free passage of air through the wall of the tube, but prevents the entrance of particles of the silencing material which would be drawn into the carburetor.

In Figures 3 and 4, is shown a modification of the construction shown in Figures 1 and 2. The casing C in this arrangement is of the same shape as that shown in Figures 1 and 2, but a horizontal plate 24 takes the place of the plate 6 and extends the whole length of the casing. The air cleaner D in this arrangement is of the same construction and cross sectional outline as the cleaner B, but also extends the full length of the casing, except for a slight space at each end, and is secured therein in the same manner as described in connection with the cleaner B.

A straight perforated air tube 25 takes the place of the tube 11, and extends from the neck 5 to within a short distance of the opposite end of the casing and its end is secured in the end wall of a chamber 26 having perforated walls. Two straight perforated tubes 27 are also secured at one end in the end wall of the chamber 26 immediately below the tubes 25 and their opposite ends are secured in the wall of an intake 28 which is substantially in the form of an inverted V and open at its bottom to register with a corresponding opening 29 in the perforated plate 24 to which it is secured. The space between the casing walls and the perforated plate 24 is packed with silencing material 22, so as to entirely surround the tubes 25, and 27 and chamber 26, and the walls of the intake 28, and walls of these parts are covered with jackets 23 of cheese cloth or other suitable material, to prevent particles of the silencing material from being drawn into the tubes and thence to the carburetor. The main volume of air which passes through the cleaner, enters the intake 28 and passes through the tubes 27 to the chamber 26 and thence through the tube 25 to the carburetor. A portion of the air also passes up through the perforated plate 24 and through the silencing material to the tubes, and the noise from this portion of the air is thus absorbed before the air enters the tube.

In Figures 5, 6 and 7, are shown arrangements of the cleaner and silencer, in which there is no direct passage from the cleaner to the outlet tube, but the whole volume of air first passes from the cleaner through the silencing material to the outlet tube, by which the noise consequent upon the inrushing air is practically absorbed before the air enters the tube.

In these figures, the casing and air cleaner are of the same shape as previously described, the cleaners being only slightly shorter than the length of the casing to leave a space between the ends of the cleaner and the end walls of the casing. In Figure 5 a housing 30 is supported within the casing above the cleaner and is spaced from the sides and one end of the casing, as shown at 31 and is perforated throughout its entire surface. A perforated outlet tube is supported in this housing and comprises two relatively large tubular portions 32 and 33, which are connected by a shorter and smaller tube 34, and a tube 35 of the same diameter as the tube 34, connects the tubular portion 33, with the outlet in the adjacent end wall of the casing, which outlet is surrounded by the neck 5 for attachment to a carburetor. The space between the tube and the housing wall is packed with silencing material and the enlarged portion 33 of the tube has concentrically supported therein a cylindrical perforated chamber 36, which is spaced at its ends and around its wall from the surrounding wall of the tube, and this chamber is also filled with silencing material. The air from the cleaner passes through the plate 24, the silencing material, and through the perforated walls of the tube, and in passage through the cleaner and to and through the tube, the consequent noise is absorbed, and the noise-absorbing action is further enhanced by the passing of the outwardly flowing air from the larger to the smaller portions of the tube and the additional action of the obstruction offered by the chamber 36 and its silencing material.

In Figure 6, a perforated cylindrical housing 37 is supported in the casing above the cleaner and is secured at one end to the casing wall 1, a space being left between the opposite end of the housing which is closed and perforated, and the adjacent end wall of the casing and between the housing wall and casing wall, as shown at 38. A second perforated housing or tube 39 is inclosed by the housing 37 and is spaced from it all around and at one end, which is closed and perforated, its opposite end being secured to the end wall 1, and the space between these tubes or housings is packed with silencing material. A double walled tube 40 is supported concentrically with the tube 39 and is spaced therefrom all around and at its inner end, its outer end being secured to the end wall 1 of the casing, the space between the two walls of the tube being closed at its inner end, both walls of the tube being perforated. The space between the walls is packed with the silencing material and the inner wall of the tube forms the outlet passage 41.

The space 42 between the double walled tube and the tube 39 is an open space and communicates with the outlet passage 41 at its inner end.

The air from the cleaner surrounds the outer tube 37 and passes through it and through the silencing material and tube 39 to the open space 42 and thence through the double walled tube and its silencing material to the outlet passage 41, a part of the air entering said passage through its inner end. Thus, the air passes through two double walls and through the silencing material between each pair of walls, by which it is greatly diffused and its velocity is decreased, so that the accompanying noise is readily absorbed by the silencing material.

In Figure 7, another form of the silencer is shown and in this form, a double walled outer tube or cylinder 43 is secured at one end to the casing wall 1 above the air cleaner, the opposite end terminating in a flat double wall 44, which is ring shaped, and from this end wall, a double conical wall 45 extends forward to within a slight distance of the opposite end of the casing. Ample space is left between the outer double cylindrical wall 43 and the inner double conical wall 45, and in this space is inserted a double walled member 46, the outer wall of which is spaced from and parallel with the double wall 43, while its inner wall converges from its rear end to its opposite end which is secured to the end wall 1 of the casing where it surrounds the opening 47 leading to the carburetor. The inner wall of the member 46 converges at a slightly less angle than that of the conical wall 45, and the space 48 between these walls constitutes the outlet passage from the silencer, and this space widens progressively towards the outlet opening 47 and joins the space 50 between the double wall 43 and the double wall 46, at its rear end. All of the walls are perforated throughout, and the space between the double walls 43, 45 and 46, are packed with silencing material.

A space is left between the ring shaped end 44 and the adjoining end of the casing and a conical recess 49 extends in from this end to the apex of the inner wall of the conical double wall 45. Air from the cleaner surrounds the double walled cylinder 43 and passes through its walls and the silencing material therein to the space 50, thence through the double wall and silencing material of the member 46, and into the outlet passage 48, a part of this air also passing directly from the space 50 into the outlet 48. Air also passes into the conical recess 49 and through the walls and silencing material of the conical member 45 to the outlet passage 48. Thus a large area is presented for diffusion of the inrushing air, and in passing through the three double walls 43, 45 and 46 and their silencing material, the velocity of the air is reduced, and the accompanying sound is effectually absorbed.

In Figure 8, is shown a construction which is more especially adapted for connection to the exhaust pipe of an internal combustion engine, although it may also be connected to the air intake to the carburetor. In this arrangement a horizontal casing 51 is provided, which is divided by a central vertical partition 52 into two chambers 53 and 54. The air cleaner B is secured in chamber 53 in the manner previously described, and a receptacle 55 forms the bottom of this chamber, and the sides of this receptacle converge towards a central opening 56 at the bottom thereof, which is normally closed by a slidable cover 57 having an opening 58 which registers with the opening 56 when the cover is slid in one direction, to discharge the refuse material from the receptacle, as will later appear.

The exhaust pipe 59 from the engine opens into one side of the receptacle, as shown. The partition 52 has a central opening 60, and a double walled tube 61 is positioned in the chamber 54 and is secured at one end to the partition 52 in line with the opening 60, the space between the walls of this tube being filled with silencing material. A double walled tube or cylinder 62 surrounds the tube 61, being open at its inner end and closed by a wall 63 at its outer end and the double walls of both of these tubes or cylinders are closely perforated throughout. A space 64 is left between the walls of the cylinders and their ends, and between the end of the cylinder 62 and the partition 52, and between this cylinder and the wall of the housing 54, and its outer end, so that a continuous, but indirect, outlet passage from the cleaner to the outlet pipe 65 of the chamber is provided.

In use, the exhaust gas enters the receptacle 55 under a succession of pulses at high pressure, and passes first through the cleaner B which separates the carbon particles from the gas and these particles drop off from the cleaner and accumulate in the bottom of the receptacle from which they may be discharged from time to time by sliding the door or cover 57 to bring its hole 58 in line with the outlet 56 of the receptacle. From the cleaner, the exhaust gas passes through the hole 60 into the tube 61 and through the indirect passage 64 to the outlet 65. During its passage, the gas is subjected to the gas pressure absorbing and sound absorbing action of the silencing material, which, while decreasing its velocity, does not cause any material increase in the resistance to its flow, and it discharges into the atmosphere free of carbon particles and practically without noise.

In Figure 9, I have shown sectional view of a vertical type of air cleaner and silencer which is arranged as follows: A cylindrical casing 66 is provided, which is open at its lower end and closed at its upper end, and within this casing and spaced therefrom, is placed a perforated cylinder 67 which is secured at its upper end to the adjacent end of casing 66. Concentrically within the cylinder 67 is placed a perforated tube 68 of less length than the cylinder and it is also secured at its upper end in a hole in the end of the casing, and forms an outlet from the casing. The bottom end of the tube is connected to the bottom end of the cylinder by a flared perforated end wall 69 and the space between the tube and the cylinder is filled with silencing material, and a circular plate 70 of about the same diameter as the cylinder is secured to the lower end of the cylinder by short connecting strips 71, so as to space the plate from the lower end of the cylinder. Surrounding the cylinder but spaced from it, is a cylindrical form of air cleaner E, which is made up of one or more thicknesses of air filtering paper faced on opposite sides with coarse mesh wire screen netting, the same as in the cleaner B. The upper end of the cleaner fits in a channel ring 72, which is secured to the end of the casing and the upper end of the cleaner fits into this channel while its lower end is bent inwardly at right angles so as to engage the under side of the plate 70, to which it is secured by screws 73.

By removing the screws 73 the cleaner can be withdrawn from the casing. The cylinder as well as the cleaner can be held against lateral movement by three or more strips 74 which are secured at one end to the lower end of the casing and at their opposite ends by the screws 73 which secure the lower end of the cleaner to the plate 70. The air is drawn up through the lower end of the casing and between the wall of the casing and the cleaner, and passes from the space between the cleaner and the cylinder 76 to the lower end of the cylinder and out through the tube 68, a portion of the air passing through the wall of the cylinder and through the silencing material and through the wall of the outlet tube. By this means, the air is thoroughly cleansed and the noise absorbed, as previously described.

The improved cleaner thoroughly cleans the air passing through it of all dust and particles of grit and other foreign matter, so that wear on the cylinders and valves of the engine from this cause is practically eliminated together with carbon deposit in the cylinders, which is largely due to the dust-laden air.

Having described my invention, what I claim as new and desire to secure by Letters Patent, is:

1. In a device of the character described, a casing having an opening in the bottom thereof, a chamber over said opening having a perforated top wall, and a perforated wall at one end thereof, the other end being one end of the casing, a passage leading from the perforated end wall and opening out through the farther end of the casing, said passage having a perforated wall, and silencing material surrounding said perforated passage wall.

2. In a device of the character described, a casing open on one side to the atmosphere, an air cleaner over said opening, a foraminous air pipe in said casing which opens out at one end through one end of the casing, its opposite end opening into the casing, a perforated covering for this end of the pipe to break the velocity of the air entering the pipe, and sound silencing material surrounding the pipe.

3. In a device of the character described, a casing having two compartments, one of which is open on one side to the atmosphere, an air cleaner over said opening, a perforated air pipe in the other compartment which opens out through one end of the compartment, its opposite end having a screened connection with the other compartment thereby to break the velocity of the air entering said pipe, and sound silencing material surrounding said pipe.

4. In a device of the character described, a casing having two compartments separated by a perforated wall, one of said compartments being open to the atmosphere on one side and an air cleaner over said opening, a perforated air pipe in the other compartment which opens out at one end through a wall of said compartment, its opposite end terminating in said compartment and communicating with the other through the said perforated wall, and sound silencing material surrounding said pipe, part of the air entering the casing passing directly through said perforated pipe and part passing through the silencing material and into said pipe through its perforated wall.

GEORGE C. RENSINK.